July 22, 1958 M. B. RIGGS ET AL 2,844,181
TIRES
Filed June 17, 1953
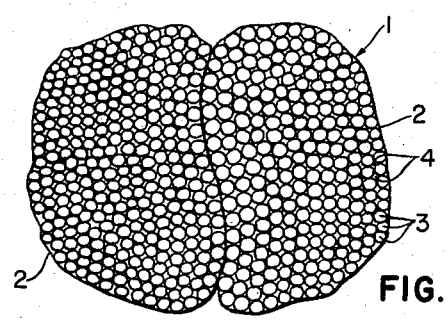
FIG. 1
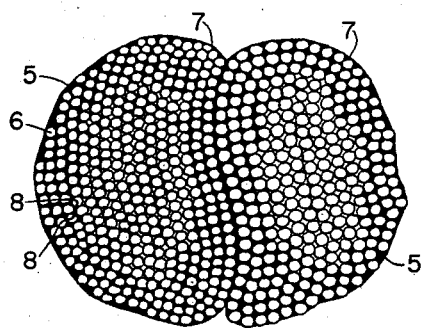
FIG. 2
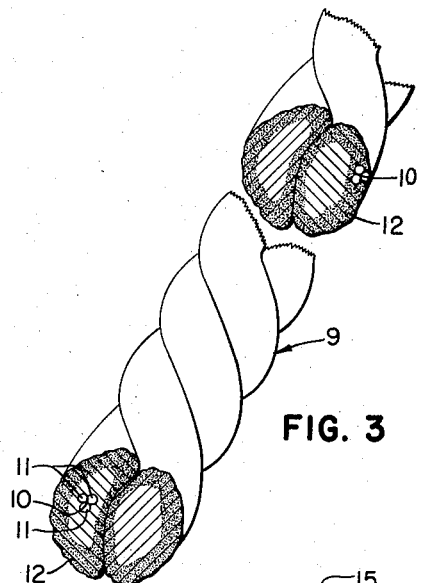
FIG. 3
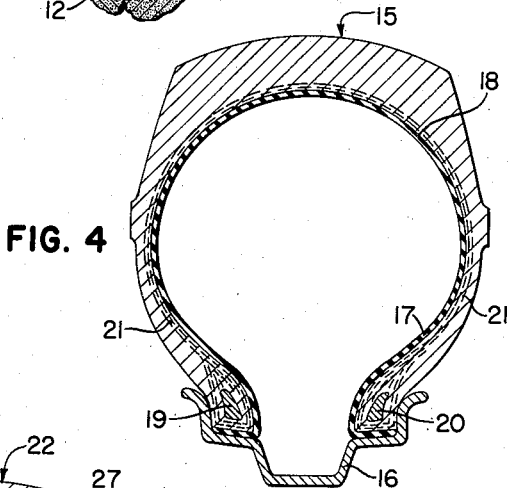
FIG. 4
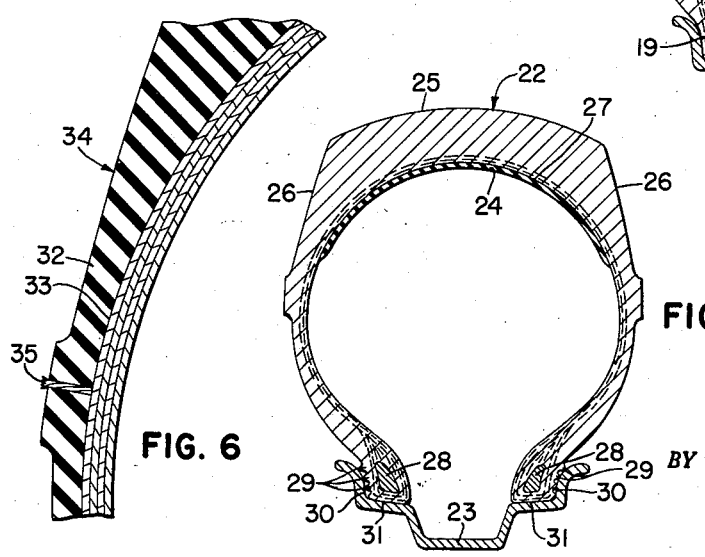
FIG. 6
FIG. 5
*INVENTOR.*
MART B. RIGGS
ROBERT B. KNILL
R. L. Miller
ATTORNEY

United States Patent Office 2,844,181
Patented July 22, 1958

2,844,181

TIRES

Mart B. Riggs and Robert B. Knill, Akron, Ohio, assignors, by mesne assignments, to The Goodyear Tire & Rubber Company, a corporation of Ohio Application June 17, 1953, Serial No. 362,182

5 Claims. (Cl. 152—354)

This invention relates to improved constructions for pneumatic tires and more specifically to improved pneumatic tires of the tubeless variety.

Various constructions are known for the production of pneumatic tires suitable for use without a separate air container or inner tube. Such known constructions have employed either a liner of considerable thickness made from natural rubber and adhered to the inner surface of the tire carcass or a thinner liner of certain synthetic rubbers which possess more resistance to diffusion than does natural rubber. The former construction, requiring a substantial thickness of rubber in the liner, produces a tubeless tire assembly which is heavier, more costly and which develops excessive heat during the running of the tire. The latter construction, requiring the use of a synthetic rubber of the butyl type or some other synthetic rubber possessing outstanding resistance to diffusion, presents certain problems in the fabrication of the tubeless tire, namely: the problem of adhering the liner to the carcass of the tire which is normally made from natural rubber, reclaimed rubber, the elastomeric copolymers of butadiene and styrene or mixtures of these, all of which are not sufficiently compatible with butyl rubber to give good adhesion. It has been thought, prior to this invention, that in order to produce a tubeless tire of minimum weight, minimum cost, minimum running temperature and satisfactory resistance to diffusion of air, it was necessary to employ a liner for the tubeless tire which was made from butyl rubber rather than the less diffusion-resistant natural rubber or the rubber-like copolymers of butadiene and styrene. It has also been believed that a tubeless tire provided with a liner of natural rubber or the elastomeric copolymers of butadiene and styrene permits excessive diffusion of air through the wall of the liner, which diffused air becomes trapped in the cord layers of the carcass of the tire and causes ply separation or tread separation when such trapped air forms pockets and expands due to the heat generated during the operation of the tire and rim assembly.

It is, therefore, an object of this invention to provide an improved construction for pneumatic tubeless tires which combines the desirable properties of minimum weight, minimum cost, minimum temperature rise during operation while at the same time maintaining resistance to loss of air. It is another object to accompilsh these results in a manner which permits the fabrication of a tubeless tire in substantially the same manner that a pneumatic tire built for use with a tube is fabricated. It is a more specific object to provide means in the improved tubeless tire to cause any air which does diffuse through the tire into the cord plies of the carcass to escape to the outside atmosphere and not remain trapped in the carcass of the tire. It is still another object to make possible the use in the liners of tubeless tires of certain rubbers previously thought to be impractical for such use. It is yet another object of this invention to provide liners for pneumatic tires which possess substantially improved adhesion to the carcass of the tire. Other objects will appear as the description proceeds.

It has been found that the production of a satisfactory pneumatic tubeless tire does not necessarily depend upon the type of rubber employed in the liner thereof but rather upon the condition of the cords employed in the fabrication of the tire carcass itself. Thus, the reason satisfactory tubeless tires could not be made using natural rubber as the liner therefor was not diffusion of the air through the wall of the liner but, rather, wicking of the air through the carcass of the tire along the path of the fabric cords imbedded in said carcass. It has now been found that by treatment of the cords before they are built into the carcass of the tire it is possible to fabricate a tubeless tire having satisfactory diffusion-resistance even if no inner-liner is employed or if a relatively thin inner-liner of natural rubber or other rubber having inferior diffusion-resistance is employed.

During the manufacture of cords or fabric from continuous filaments the aligning of the individual filaments leaves interstices along the axis of the cord which provide a channel for the escape of air. This escape of air along the interstices present in the cords is capillary in nature and similar to the wicking of liquids along the path of any fabric structure. It has been found that, by suitable treatment of certain types of cords or fabric, the wicking action can be greatly minimized or prevented.

The invention will be more readily understood with reference to the accompanying drawings.

Fig. 1 is a cross-sectional view of a two-ply, continuous-filament cord showing the condition of the interstices between the filaments before the cord is treated.

Fig. 2 is a cross-sectional view of a cord similar to that shown in Fig. 1 but representing the condition of the interstices between the filaments after the cord has been coated with a dip solution.

Fig. 3 is an isometric view of the dipped cord shown in Fig. 2 with two sections of the cord broken away to indicate the condition of the cord at different longitudinal points.

Fig. 4 is a cross-sectional view of a tubeless tire mounted on a rim with a thin liner adhered to the inner surface of the tire.

Fig. 5 is a cross-sectional view of a tubeless tire mounted on a rim with an inner liner extending only adjacent the tread and parts of the sidewall portions of said tire.

Fig. 6 is a fragmentary cross-sectional view of a tire sidewall showing a venting means between the cord plies of the tire carcass and the outside of the tire.

Fig. 1 represents an enlarged cross section of a cord 1, of the continuous-filament type, made up of two plies 2, 2, each one of which contains a plurality of individual continuous filaments 3. The continuous filaments 3, by their location with respect to one another, form open substantially continuous interstices 4 through which air can travel along the length of the cord 1.

Fig. 2 shows in cross section the condition of the cord shown in Fig. 1 after an impregnant 5 has penetrated between the filaments 6 and between the plies 7, 7. It will be apparent that the interstices 8 located in the outer circumferential region and between the plies 7, 7 have been filled so as to prevent the passage of air therethrough.

In Fig. 3 is shown the condition of the interstices present in the impregnated cord shown in Fig. 2 as those interstices extend along the length of the cord 9. To illustrate the manner in which the impregnant or coating prevents the wicking of air along the cord, the cross section through the cord at the bottom of Fig. 3 is shown with a specific interstice 10 formed by three filaments 11, 11, 11 located in the center of ply 12 which is not filled with the impregnant so that air at this point can pass axially along the cord using the interstice as a channel. However, in the upper cross section of Fig. 3, the specific interstice 10, due to the twist of the filaments 11, has moved from the center of the ply 12 to the outer circumferential region of the ply 12 where the impregnant blocks the further passage of air axially of the cord. The loss of air through or along the cords is, therefore, considerably reduced and in fact practically eliminated by impregnating the cords in a manner to provide successive dams or interruptions along the axis of the cord and in the outer region of the individual plies employed in the cord so that individual interstices are periodically interrupted by the impregnant so as to prevent the wicking of the air axially of the cord.

In explanation of the effectiveness of the method, it will be noted that the individual filaments 11, when woven into the ply 12, are not only twisted in relation to one another but are also twisted along the axis of the individual ply 12. This, in effect, causes the interstices present in the center of a ply at a given section therethrough to move to the outer portions of the ply farther along the axis of the cord so that the individual interstices present in the center of any individual cross section eventually become interstices located in the outer circumferential regions of the cord and plies where they may be readily filled with impregnant to prevent the wicking of air without requiring excessive penetration of the impregnating material.

Fig. 4 shows a tubeless tire 15 mounted on a rim 16 with an inner liner 17 adhered to the inner surface 18 of the tire 15 and extending substantially from bead 19 to bead 20. The cord or fabric plies 21 present in the tire 15, if impregnated in a manner to produce the condition shown in Fig. 2, can be used to construct a satisfactory tubeless tire without employing a liner at the inner surface 18 thereof although it is preferred that an inner liner be used. The condition of the impregnated cords is such that, even if cord ends are exposed to air at the inner surface 18 of the tire, such air will not be wicked through the carcass of the tire 15 to the outside thereof nor will the air form pockets in the cord or fabric plies 21 in a manner to cause ply separation or tread separation.

Fig. 5 is another specific embodiment of this invention showing a tubeless tire 22 mounted on a rim 23. An inner liner 24 is provided to cover an area corresponding approximately to the road-contacting surface of the tire, i. e. its tread surface 25, and part of the sidewalls 26, 26. This inner liner 24 is employed primarily to facilitate repair of the assembly in the event of puncture and secondarily to provide increased resistance to diffusion of air through the carcass of the tire. A repair patch will adhere and be more readily anchored to the rubber surface of the liner 24 than it would be to the fabric surface 27 of the tire carcass itself. The composition of the liner 24 need not be a material highly resistant to diffusion but should be of a material which will readily adhere to the inner surface 27 of the tire. Preferred materials for this inner liner are natural rubber, reclaimed rubber, the elastomeric copolymers of butadiene and styrene or mixtures of these. Provision is made for sealing the tire against the rim 23 in the area of the tire beads 28, 28. The seal can be accomplished by providing ribs 29, 29 on the axial outer face of the bead portions 28, 28, the ribs extending circumferentially of the tire and sealing against the inner rim flange surface 30, 30. The ribs may also be located on the bead-seating faces 31, 31. Other sealing means, such as an additional layer of rubber over the bead-seating faces and the faces opposite the inner rim flange surfaces 30, 30, may also be employed.

In Fig. 6 is shown another specific embodiment of this invention in which a vent is provided in the sidewall 32 between the outer ply 33 of the tire carcass 34 and the outside of the tire. To achieve this a cotton cord 35 is imbedded in the sidewall rubber before the sidewall is vulcanized to the cord plies so that any air which does diffuse through the cord plies will be provided with a convenient avenue of escape to the outside atmosphere and will not collect or pocket in the fabric plies of the sidewall, causing ply separation. It will be obvious that in place of the cotton cord 35 other similar cords may be used or a hole may be punctured in the rubber of the sidewall 32 to extend from the outside of the tire down to the outer ply 33 of the tire 34.

It should be understood that the practice of this invention is directed to treatment of cords or fabric of the continuous-filament type, such as rayon and nylon cords or fabric and that it does not apply to treatment of cotton tire cords which are fabricated from staple fibers. Such staple fibers do not provide continuous interstices as do the continuous-filament cords or fabrics and consequently it is difficult to impregnate cotton cord or fabric in a manner which will interrupt the interstices between the fibers present along the axis of the cotton cord or fabric.

While Figs. 1, 2 and 3 show strands or cords made from two plies it is to be understood that this invention applies as well to continuous-filament cords, strands and fabrics the individual strands of which are made up of one or more plies.

The type of impregnant used to fill the interstices of the cords or fabric is not critical for the purposes of this invention so long as such impregnant gives a cord or fabric which retains its relative flexibility and which, at the same time, does not possess any substantial number of continuous interstices. It is preferred that the impregnant be applied to the cord in the form of a solution or dispersion for the reason that the cord or fabric is more readily penetrated by the impregnant in such form. In general, the cords or fabric should be dipped into the impregnant solution or dispersion in a relaxed state and not under tension so as to facilitate the penetration of the interstices by the impregnant. After the cord or fabric has been dipped into the impregnant solution or dispersion, best results are obtained by subjecting it to tension in order to re-align and compact the filaments so that the treated cord or fabric contains a minimum interstitial cross-section. After being treated with impregnant, the cord or fabric is then frictioned or coated with conventional rubber compounds and fabricated into tires in accordance with usual tire manufacturing procedures.

Preferred cord or fabric treatments are those which are commonly used in the rubber industry to improve the adhesion between the cord or fabric and the body of rubber to which it is to be adhered. Examples of such preferred treatments are those which contain mixtures of (1) a rubber latex and a protein, (2) a rubber latex and a soluble aldehyde resin, (3) a rubber latex, an aldehyde and a reactant capable of forming a resin with the aldehyde and (4) a rubber latex, a protein and a soluble aldehyde resin.

Specific examples of suitable treatments and methods for treating the cord or fabric with the impregnant are fully described in the following United States Patents: 2,098,038; 2,211,948; 2,314,998; 2,561,215; and 2,615,826.

Examples of the protein material usable in these impregnants are casein, gelatin, wheat protein, fish or animal glue, albumin, haemoglobin and dried blood.

Examples of the rubber latices which may be employed are natural rubber latex, the synthetic rubber latices resulting from the polymerization of butadiene with styrene, e. g., GR–S, and butadiene with vinyl pyridine.

The aldehyde portion of the impregnant may be employed in its unreacted condition along with its complementary resin-forming reactant or it may be employed in a partially condensed condition. Examples of the aldehydes which may be used are formaldehyde, acetaldehyde, butyraldehyde and furfural. Examples of the complementary resin-forming reactants are the phenols or phenolic compounds such as phenol, cresol, xylenol, naphthol and resorcinol, the amines such as aniline, cyanamide and urea.

Of the treatments listed above, particularly preferred are those which contain phenols and aldehydes, rather than protein, for the reason that such dispersions, containing materials of lower molecular weight, are not as viscous as the protein-containing dispersions. For this reason the phenol-aldehyde-containing solutions more readily penetrate into the interstices of the fabric or cord to be treated.

As indicated above it has been found that the use of such treatments make possible the fabrication of a tubeless tire in which either natural rubber, reclaimed rubber, the rubber-like copolymers of butadiene and styrene or mixtures of these is employed as the inner liner. The employment of a partial liner extending over only an area corresponding to the road-contacting surfaces of the tire does not appreciably add to the cost of the finished product while it does produce a construction which is more readily repaired in the event of puncture, since a repair patch or plug can be adhered more readily to the rubber surface of the liner. In the event that a full liner is employed, a comparatively thin one may be employed. Contrary to what is taught in the prior art, the present invention permits the construction of a tubeless tire with a liner of natural rubber for instance, which liner can be as little as approximately .010 inch in thickness and in no instance is it necessary to employ a liner in excess of approximately 0.125 inches thick.

Another feature of this invention is the provision of a venting means in the tire which permits the escape of any air which may have diffused through the carcass of the tire. This venting means in effect is an optional safety valve to prevent the accumulation of air in the carcass of the tire which accumulation, as it builds up and expands due to the heat generated in the operation of the assembly, may cause ply separation or damage to the tread portion of the assembly.

While certain representative embodiments and details have been shown for the purpose of illustrating the invention, it will be apparent to those skilled in this art that various changes and modifications may be made therein without departing from the spirit or scope of the invention.

We claim:

1. A pneumatic tire suitable for use without an inner tube, said tire comprising an open bellied hollow annular body terminating in spaced apart bead portions, said body containing a plurality of plies of vulcanizable rubbery composition reinforced with cords composed of a plurality of synthetic continuous filaments which form interstices in each cord located between adjoining and contacting filaments, said filaments being twisted together to form said cords, said filaments and the interstices formed thereby moving in an in-and-out path along said cords alternately from the interior of each cord to the outer circumferential region of each cord, said interstices when positioned in said outer circumferential region being filled with an impregnant deposited in said cords prior to the reinforcement of the rubbery composition by said cords, said impregnant providing a plurality of interruptions in said interstices which prevent the movement of pressurized air along the path of said interstices, and an inner liner for said tire extending substantially from bead portion to bead portion and adhering to the inner face of said tire, said liner being from 0.010 to 0.125 inch thick and comprising at least one rubber-like material selected from the group consisting of natural rubber, reclaim rubber, and the elastomeric copolymers of butadiene and styrene.

2. A pneumatic tire defined by claim 1 in which the inner liner extends only over that surface corresponding to the road-contacting surface of said tire.

3. A pneumatic tire suitable for use without an inner tube, said tire comprising an open bellied hollow annular body terminating in spaced apart bead portions, said body containing a plurality of plies of vulcanizable rubbery composition reinforced with fabric layers made from cords composed of a plurality of synthetic continuous filaments which form interstices in each cord located between adjoining and contacting filaments, said filaments being twisted together to form said cords, said filaments and the interstices formed thereby moving in an in-and-out path along said cords alternately from the interior of each cord to the outer circumferential region of each cord, said interstices when positioned in said outer circumferential region being filled with an impregnant deposited in said cords prior to the reinforcement of the rubbery composition by said cords, said impregnant providing a plurality of interruptions in said interstices which prevent the movement of pressurized air along the path of said interstices, and an inner liner for said tire extending substantially from bead portion to bead portion and adhering to the inner face of said tire, said liner being from 0.010 to 0.125 inches thick and comprising at least one rubber-like material selected from the group consisting of natural rubber, reclaim rubber, and the elastomeric copolymers of butadiene and styrene.

4. In the combination of a rim and a pneumatic tire suitable for use without an inner tube, the improvement in the pneumatic tire which comprises employing in the body of said tire a plurality of plies of vulcanizable rubbery composition reinforced with cords composed of a plurality of synthetic continuous filaments which form interstices in each cord located between adjoining and contacting filaments, said filaments being twisted together to form said cords, said filaments and the interstices formed thereby moving in an in-and-out path along said cords alternately from the interior of each cord to the outer circumferential region of each cord, said interstices when positioned in said outer circumferential region being filled with an impregnant deposited in said cords prior to the reinforcement of the rubbery composition by said cords, said impregnant providing a plurality of interruptions in said interstices which prevent the movement of pressurized air along the path of said interstices, and providing said pneumatic tire with an inner liner for said tire extending substantially from bead portion to bead portion and adhering to the inner face of said tire, said liner being from 0.010 to 0.125 inch thick and comprising at least one rubber-like material selected from the group consisting of natural rubber, reclaim rubber, and the elastomeric copolymers of butadiene and styrene.

5. In the combination of a rim and a pneumatic tire suitable for use without an inner tube the improvement in the pneumatic tire which comprises employing in the body of said tire a plurality of plies of vulcanizable rubbery composition reinforced with fabric layers made from cords composed of a plurality of synthetic continuous filaments which form interstices in each cord located between adjoining and contacting filaments, said filaments being twisted together to form said cords, said filaments and the interstices formed thereby moving in an in-and-out path along said cords alternately from the interior of each cord to the outer circumferential region of each cord, said interstices when positioned in said outer circumferential region being filled with an impregnant deposited in said cords prior to the reinforcement of the rubbery composition by said cords, said impregnant providing a plurality of interruptions in said interstices which prevent the movement of pressurized air along the path of said interstices, and providing said pneumatic tire with an inner liner for said tire extending substantially from bead portion to bead portion and adhering to the inner face of said tire, said liner being from 0.010 to 0.125 inch thick and comprising at least one rubber-like material selected from the group consisting of natural rubber, reclaim rubber, and the elastomeric copolymers of butadiene and styrene.

References Cited in the file of this patent

UNITED STATES PATENTS

| | | |
|---|---|---|
| 2,098,038 | Hazell et al. | Nov. 2, 1937 |
| 2,235,867 | Castricum et al. | Mar. 25, 1941 |
| 2,331,323 | Jahant | Oct. 12, 1943 |
| 2,575,249 | Connell et al. | Nov. 13, 1951 |
| 2,587,428 | Antonson | Feb. 26, 1952 |
| 2,587,470 | Herzegh | Feb. 26, 1952 |
| 2,601,394 | Hansen | June 24, 1952 |
| 2,640,523 | Palmer | June 2, 1953 |

FOREIGN PATENTS

| | | |
|---|---|---|
| 562,137 | Great Britain | June 20, 1944 |
| 122,731 | Australia | July 22, 1944 |